United States Patent Office

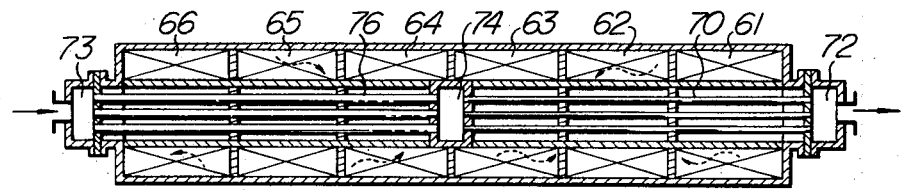
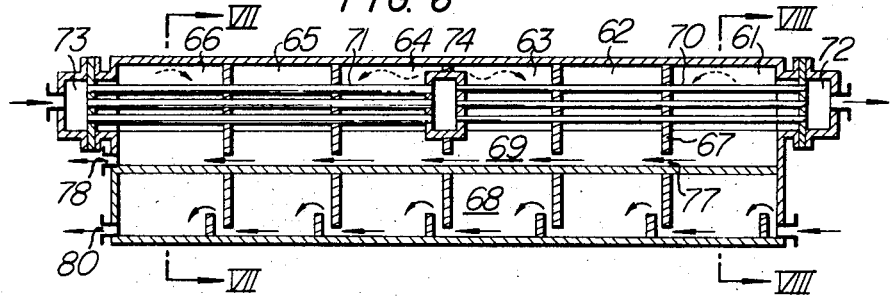
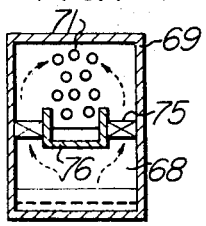 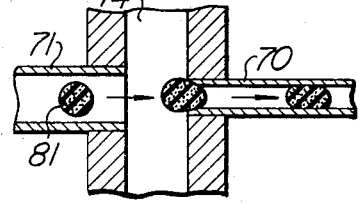 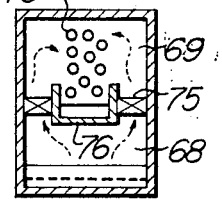
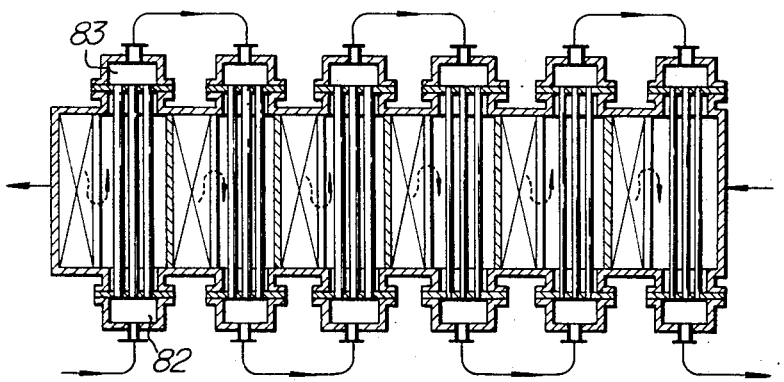

3,707,442
Patented Dec. 26, 1972

3,707,442
MULTISTAGED FLASH EVAPORATOR AND A METHOD OF OPERATING THE SAME WITH SPONGE BALL DESCALING TREATMENT
Sankichi Takahashi, Katsumoto Otake, and Toshiaki Horiuchi, Hitachi, Japan, assignors to Hitachi, Ltd., Tokyo, Japan
Filed Feb. 27, 1970, Ser. No. 15,073
Claims priority, application Japan, Mar. 5, 1969, 44/17,046, 44/17,047; June 16, 1969, 44/46,860; July 18, 1969, 44/56,455, 44/56,456, 44/56,457, 44/56,458, 44/56,459, 44/56,460
Int. Cl. B01d 3/00; F28g
U.S. Cl. 203—1      15 Claims

ABSTRACT OF THE DISCLOSURE

A multistaged flash evaporator for obtaining distilled water by flashing a heated brine and cooling the generated steam by the brine, wherein the brine is heated beyond a temperature of educing scale on heating surfaces but the educed scale is removed by sponge balls passed through heating tubes or by occasionally supplying brine of low temperature through the heating tubes.

BACKGROUND OF THE INVENTION

(1) Field of the invention

This invention relates to a multistaged flash evaporator for obtaining distilled water for the purposes of drink or industrial uses from a brine, especially sea water and a method of operating such an evaporator.

(2) Description of the prior art

A multistaged flash evaporator is generally composed of multistaged flash chambers having gradually lowering pressures, and a heated brine is successively evaporated in those chambers, wherein the generated steam is cooled by heat exchanger tubes or brine tubes, which in turn heat the brine passed therethrough, to become desalted condensate which is delivered for drink or industrial purposes.

The evaporators of this kind are classified with respect to their brine tube arrangements into an orthogonal type and a linear type. In the former type, the brine tubes in respective flash chambers are arranged in orthogonal flow relation to the flashing brine flows, while in the latter type the brine tubes are arranged in linear flow relation to flashing brine flows.

The brine which has been preheated in the brine tubes by the flashed steam is further heated in a brine heater, and then is introduced into the first stage flash chamber. Thus, the brine which still remained in the last stage flash chamber after successive flashing processes is discharged from the last flash chamber, and this brine, in a type of evaporator, is in part recirculated and in another type of evaporator, is exhausted.

In conventional evaporators of this kind, the temperature of the brine at the outlet point of the brine heater is generally kept in the range of 60–120° C. This limitation is imposed from the eduction of dissolved substances in the brine. In more details, brines to be processed by the evaporators of this kind are controlled of their pH-value or applied a desalting treatment, and therefore, when they are heated up to 80° C., soft scales such as Mg(OH)₂, Ca(OH)₂, etc. are educed. If they are further heated up to 120° C., hard scales such as $$CaSO_4 \cdot \tfrac{1}{2} H_2O$$ 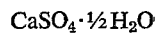

CaSO₄·H₂O, etc. are educed. These scales attach to the walls of the brine tubes and solidify. It is very difficult to remove these scales, especially hard scales by chemical treatments. If the scales attach to the inner walls of the brine tubes, the heat transfer rate of the heat exchanger tubes is very much lowered, and furthermore, there is a danger that the local corrosions of the brine tubes occur, which may become a cause of a tube rupture.

As a countermeasure against these troubles, the so-called seed method has been proposed. This method is based upon an idea of mixing powder of CaSO₄, which is called "seed," into brines so that the growth of scales around the seed as nuclei is accelerated with less tendency of growth of scales on the inner walls of the tubes. However, this method is not efficient in preventing the attachment of scale to the inner walls of the brine tubes, and therefore, is not yet practised. The reason for the inefficiency is explained by the phenomenon of attaching and growing of the CaSO₄ scale. The temperature of the brine in a boundary layer over the inner wall of a heating tube is higher than that of the brine flowing through a central region of the tube, and therefore, vapor is generated along the inner wall of the tube. The temperature of the vapor bubbles at the boundaries in contact with the inner wall of the heating tube is considered to be higher than the scale eduction temperature, and in such regions the eduction of CaSO₄, etc. begins with subsequent growth of the scale.

In the production of pure or distilled water, there is a requirement that the water production rate, which is defined by the following formula, is high:

Water production rate $$= \frac{\text{Gross water production of plant } (t/h)}{\text{Steam consumed in heater } (t/h)}$$

The water production rate has an intimate relation with the generation of scale. As the temperature of the brine at the brine heater outlet becomes higher or steam of a higher temperature is used for heating the brine, the number of stages of the water distilling plant is increased and the water production rate is improved. With a plant of a determined number of stages, the water production capacity, which is defined in the following formula, is increased as the temperature of brine at the brine heater outlet is higher:

$$\eta = (i_2 - i_1)/n$$

where:
$i_2$: Enthalpy at the entrance of the first stage of the evaporator
$i_1$: Enthalpy at the exit of the last stage of the evaporator (assumed as constant)
$n$: Number of stages As it is evident from the above-mentioned formulae, it is very desirable that the brine which is introduced into the first stage of the evaporator is heated at a higher temperature. However, such a high temperature that exceeds 120° C. is not preferable in the viewpoint of attachment of hard scales such as CaSO₄ on the inner walls of the brine tubes. Thus, the brine temperature should be limited below about 120° C.

When an evaporator is operated within a temperature range of 80–120° C., a brine should be perfectly removed of Mg(OH)₂ and Ca(OH)₂ by chemical treatments before it is introduced into the evaporator to avoid the attachment of soft scales.

Thus, the conventional evaporators are designed to operate with the brine concentration ratio of 1.5 and at a brine temperature of lower than 120° C. (or 80° C. in some cases).

When the brine concentration ratio is as low as 1.2–1.5, the concentrated brine cannot be used for other chemical industrial purposes, though highly concentrated brines are apparently useful in chemical industries, especially caustic soda industries and such production of by-products is favorable in the viewpoint of a versatile operation of a plant. To obtain such an advantage, however, the contradiction of a high brine temperature and the scale eduction must be solved.

SUMMARY OF THE INVENTION

Accordingly, the main object of this invention is to accomplish efficient operation of a multistaged flash evaporator with a heated brine temperature of higher than 120° C. while preventing permanent attachment of scale on the inner walls of brine tubes.

Another object of this invention is to clean the inside of the brine tubes by mechanical means, especially sponge balls in order to prevent fall of the heat transfer rate in the evaporator.

Still another object is to provide means for passing the sponge balls through the brine tubes in a manner effective to remove the scale.

A further object of this invention is to remove the scale by non-mechanical means in order to prevent fall of the heat transfer rate in the evaporator.

Still another object is to improve the rate of operation of a multistaged flash evaporator by removing the scale very quickly with non-mechanical means.

Still another object is to accomplish continuous operation of a multistaged flash evaporator.

Still further object is to provide a method of operating a multistaged flash evaporator, whereby the scale is effectively removed.

Still further object of this invention is to combine a mechanical method of removing the scale with a non-mechanical method of removing the scale.

BRIEF DESCRIPTION OF THE DRAWINGS

In the accompanying drawings;

FIG. 5 is a horizontal section of a multistaged flash chamber assembly according to this invention;

FIG. 6 is a vertical section of the assembly shown in FIG. 5;

FIG. 7 is a cross section by line VII—VII in FIG. 6;

FIG. 8 is a cross section by line VIII—VIII in FIG. 6;

FIG. 9 shows a portion of FIG. 6 in an enlarged scale;

FIG. 10 is a horizontal section of another multistaged flash chamber assembly according to this invention;

DESCRIPTION OF THE PREFERRED EMBODIMENTS

As described before, it is an important feature of this invention that the brine which is to be evaporated in multistaged flash chambers is heated beyond a scale eduction temperature and the scale which has attached on the inner walls of brine heating tubes is removed by sponge balls passed therethrough by being suspended in the brine, thereby to keep high water production rate and water production capacity.

Figure 3:
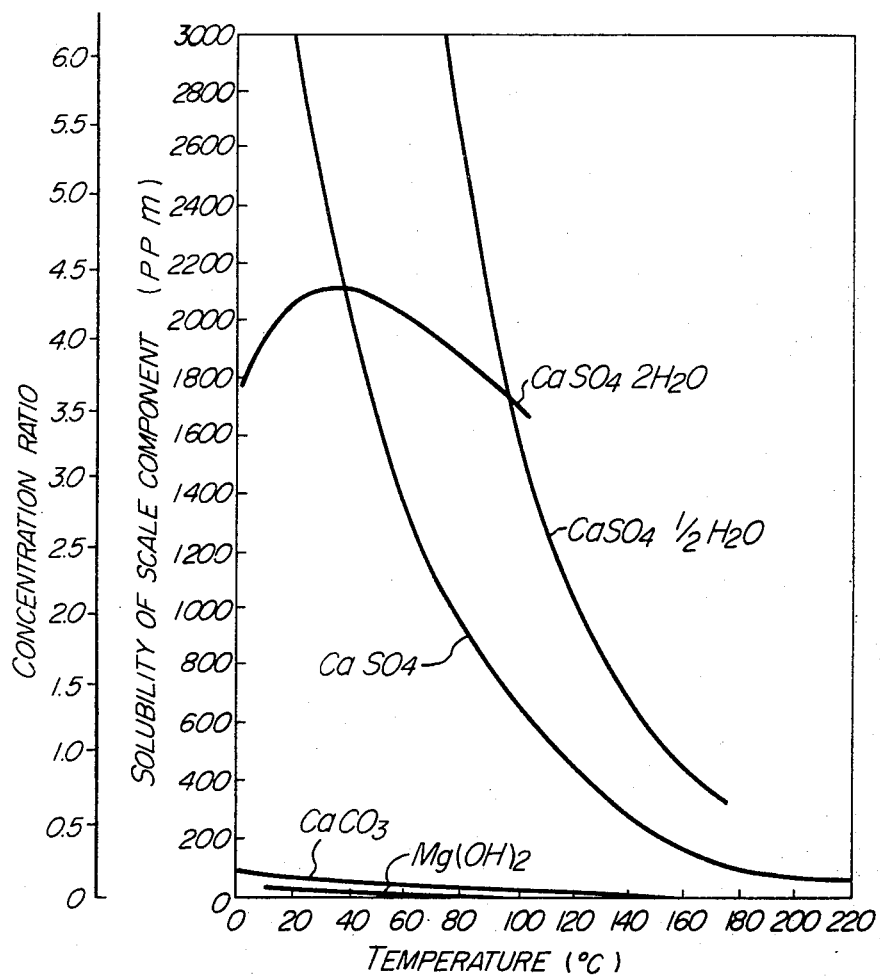
FIG. 3 is a graph showing relations between the scale educing temperature and the brine density about several hard scales.

Eduction limits of several scales are given in FIG. 3 as the relation of solubility of scale component to the brine temperature. As a brine is heated, the concentrations of scale components reach the limits of solubility and the scales begin to educe and attach on the inner walls of brine heating tubes. If this condition of operation is continued, the scale on the inner walls gradually grows and firmly sticks thereto, and finally it becomes very difficult to remove it. However, in an early period of scale attaching phenomenon, the force of attachment of the scale is not so strong that it cannot be removed by scrubbing of sponge balls. The sponge balls for this purpose are elastic balls having a diameter a little larger than that of the brine tubes and made of natural rubber or synthetic rubbers such as butyl rubber, chloroprene, SBR, hi-styrene rubber, nitrile rubber, urethane rubber, etc.

It is known to use sponge balls for cleaning the inner walls of a condenser of a steam turbine plant. However, in case of condensers of the kind, the cooling water or sea water which is passed through the condenser tubes and heated by the steam flowing along the outer surfaces of the condenser tubes reaches a temperature of about 40° C. at the highest, and therefore, there occurs no eduction of soft or hard scales. Therefore, the sponge balls in such a conventional use are merely intended to prevent impurities and fur contained in the cooling water from depositing on the inner walls of the condenser tubes.

To the contrary, this invention contemplates to practice a higher heating temperature of the brine by removing scale attached on the inner walls of the brine tubes by such mechanical means as the sponge balls, and therefore, this invention relates to an idea quite different from that of the prior art.

The removal of the scale which grows on the inner walls of brine heating tubes when the brine is heated up to a high temperature can be accomplished without employing such mechanical means as the sponge balls but by temporarily passing brine through the brine tubes at a low temperature by temporarily cutting off the heat source of the brine heater after a predetermined period of operation at a higher temperature than 120° C. has lapsed. It was found by the inventors that the scale which has attached on the inner walls of the brine tubes during the operation at a higher temperature than 120° C. can be dissolved out into brine of a lower temperature than 120° C. during a relatively short period of cleaning process. This fact is very significant to the flash evaporators because it means that the scale can be removed during a continuous feeding of brine, whereby it implies that the water production rate and the water production capacity can be improved without increasing the water production cost. Furthermore, this fact implies that it is possible to practice a water production process by omitting the pretreatment of brine such as deoxidization, pH control, etc.

By passing brine of a low temperature through brine tubes having scale attached therein, not only soft scales but also hard scales are dissolved and removed. The dissolving rate of scales is proportional to the flow rate of brine, and therefore, quick descaling can be seeked by increasing the flow rate of brine in such a cleaning process.

Figure 1:
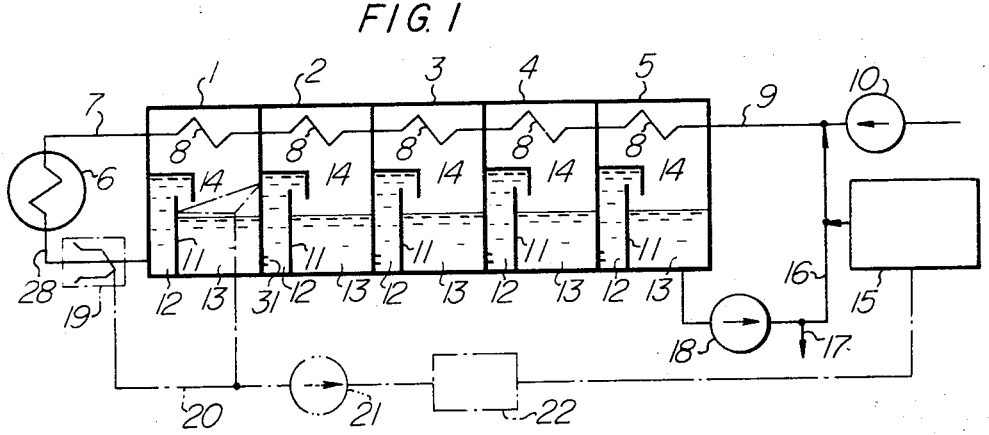
FIG. 1 is a diagram showing an embodiment of the multistaged flash evaporator of this invention.

In FIG. 1, there is shown a multistaged flash evaporator including five flash chambers as an example. In this evaporator, reference numerals 1 to 5 designate first to fifth stage flash chambers, respectively, wherein the first stage flash chamber is a high pressure stage, the second and third being medium pressure stages and the fourth and third being medium pressure stages and the fourth and fifth being low pressure stages, respectively. A brine heater 6 is adapted to be supplied with such brine via a brine conduit 7 that has passed through and been heated at condenser parts 8 of the respective flash chambers. The brine tubes constituting the condenser parts 8 may be arranged as orthogonal elements or linear elements with respect to the flashing flow in the evaporator. The condenser parts 8 are arranged to be in good contact with the steam which is generated in the respective flash chambers. For this purpose, the condenser parts 8 are, for example, each positioned at an upper region of the flash chamber.

The term such as brine tube or brine conduit used in this specification is to be construed as including tube as well as valve and other fittings apparently necessary to constitute a conduit for accomplishing the purpose of transferring brine.

The condenser part 8 of the last stage flash chamber 5 is supplied with brine by a pump 10 via a conduit 9. A lower portion of each flash chamber is divided by a dam plate 11 into a flash box 12 and a flashing part 13. A deflector 14 is provided above the dam plate 11. The brine heater 6 heats the brine supplied through the conduit 7 up to a temperature higher than the scale eduction temperature and delivers it through a conduit 28 to the flash box 12 of the first stage. If, for example, sea water is heated above 80° C., soft scales will educe, and if it is heated above 120° C. hard scales will educe.

The brine remaining in the flash part 13 of the last stage is pumped by a pump 18 through a return conduit 16 to the brine feed conduit 9. A sponge ball feeder 15 is opening in the way of the conduit 16 to supply sponge balls into the brine fed to the condensers 8 so that the sponge balls suspended in the brine clean the inner walls of the condenser tubes 8 as they flow therethrough. The brine and the sponge balls suspended therein are then passed through the brine heater 6, where the sponge balls also clean the inner walls of heating tubes of the heater. The brine, thus heated above 120° C., is, as an embodiment, introduced into the flash box 12 of the first stage together with the sponge balls.

Figure 2:
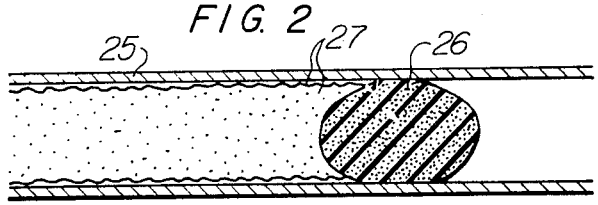
FIG. 2 is a schematical section of a tube portion in FIG. 1.

FIG. 2 shows the cleaning process by a sponge ball, wherein a layer of scale 27 softly attached on the inner wall of a brine tube 25 is wiped off by a sponge ball 26 which has a diameter slightly larger than the inner diameter of the tube 25.

The mixture of the brine and the sponge balls introduced into the flash box 12 is flashed there and flows upward as a two-phase flow of steam and liquid. The mixture of steam and liquid (including the balls) is then deflected by the deflector 14 and flows into the flashing part 13. In the flashing part, the steam rises toward the condenser part 8, where it is cooled and condensed. Unevaporated brine including the sponge balls is collected in the bottom of the flashing part 13 and is introduced to the flash box of the next stage through a passage 31. Since in this embodiment the sponge balls must flow out together with the brine through the passage 31 provided at the bottom of the flashing part, it is necessary that the sponge balls have a specific gravity larger than that of the brine or preferably a specific gravity slightly larger than that of the brine. Such sponge balls can be produced by mixing natural or synthetic rubbers with a foaming agent, foaming promoter, curing agent, softening agent, etc. and powder of solid materials having specific gravity larger than 2.0 g./cm.$^3$ such as powder of metal, metallic compound or inorganic compound, kneading or agitating the mixture until the additives are uniformly dispersed in the rubber, and curing as well as foaming the mixture, whereby a porous material having specific gravity of 1.05–3.00 g./cm.$^3$ is obtained.

In flash boxes 12, the specific gravity of the sponge balls lowers due to evaporation of brine, and therefore, the sponge balls can readily rise in the flash boxes together with the above-mentioned two-phase flow.

The unevaporated brine and the sponge balls remaining in the flashing part 13 of the last stage are drawn from the stage by the pump 18, and are supplied to the conduit 9 for recirculation. Sponge balls may be supplemented from the sponge ball feeder 15 if required. A portion of the brine discharged from the last stage is taken out from the conduit 17 to be used in chemical industries, especially caustic soda industries.

According to the process of this invention, it is very easy to obtain brine of 5 times concentration of the sea water.

In the above-mentioned process, the sponge balls are circulated through all circuits of the brine by being suspended in the brine, wherefore the specific gravity of the sponge balls must be selected in a proper range. However, the sponge balls may bypass the flashing stages by being collected in a sponge ball collector 19 provided in the conduit 28 and transported with an amount of brine through a conduit 20 including a pump 21 to a sponge ball reservoir 22, from which the balls are transferred to the sponge ball feeder 15.

The sponge balls delivered from the feeder 15 may be introduced into the conduit 9, 7 or 28 instead of the conduit 16 when the balls are circulated through all circuits of the brine.

When the sponge balls are bypassed around the flashing stages, there is an advantage that the specific gravity of the sponge balls need not be specified on one hand, but there are disadvantages that a portion of the heated brine bypasses the flashing stages and that an additional power is required to take out the balls from a vacuum region, on the other hand.

Figure 4:
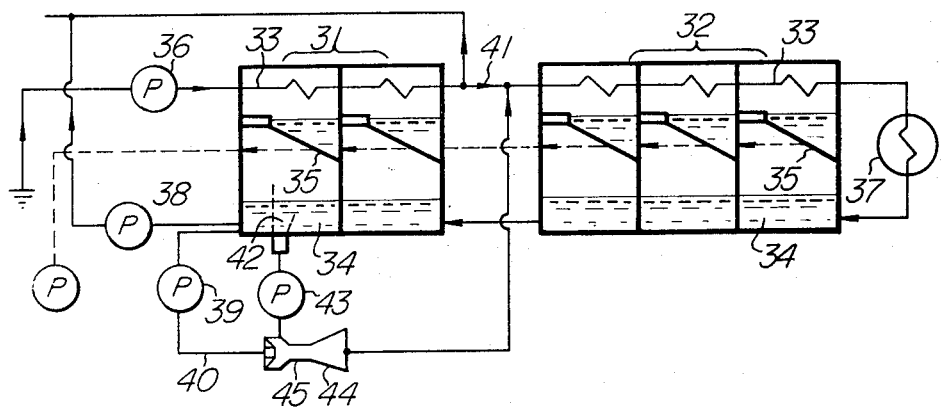
FIG. 4 is a diagram showing another embodiment of this invention.

In FIG. 4, there is shown an embodiment of the multistaged flash evaporator, wherein the scale removed from the brine tubes by the sponge balls is further pulverized to be utilized as the seed for the measure of lessening the attachment of scale on the inner walls of the brine tubes. In this embodiment an ejector for ejecting sponge balls is provided in a brine recirculation line which transfers the brine remaining in the last flashing stage to the entrance of a condenser of an intermediate stage. By the ejecting function of the ejector, the scales contained in the brine are pulverized.

The evaporator shown in FIG. 4 includes a heat exhausting section 31 and a heat recovering section 32, each including flashing stages each composed of a condenser part 33, flashing or evaporating part 34 and condensate part 35. A brine or sea water drawn up by a pump 36 is heated in the condenser part 33 and a brine heater 37 and is introduced into the evaporating part 34 of the first stage, where a portion of the brine is evaporated. After the successive flashing evaporation in the respective stages, the brine remaining in the last stage is in part exhausted by a blowdown pump 38 and in part recirculated by a recirculation pump 39 through a recirculation line 40 to a brine feed line 41. The sponge balls contained in the brine are collected by a sponge ball collector 42 provided in the evaporating portion 34 of the last stage and are transferred by a bladeness pump 43 to a sponge ball ejector 44 provided in the recirculation line 40. The bladeless pump 43 may be omitted in some operating conditions.

The scales which have attached on the inner walls of the brine heater 37 and the condenser tubes 33 are removed by the sponge balls and finally introduced into the ejector 44 through the recirculation conduit 40. When the scales suspended in the brine flow through a throttled portion 45 of the ejector, impacts are given to those scales by ejection of the sponge balls, whereby the scales are pulverized. The pulverized scales flow through the recirculation conduit 40, condenser tubes 33 of the heat recovering section 32 and brine heater 37, where they become the seed for forming granular scales suspended in the flow of brine. According to this method, since the attachment of scale on the inner walls of the brine tubes becomes moderate due to the seeding effect, the amount of the sponge balls may be decreased.

As another embodiment of this invention, it is proposed to let the sponge balls flow through only those brine tubes where brine temperature is above the scale eduction temperature. Such a constitution is effective not only in the economy of pumping power but also in preventing tearing off of oxidized protection films generated on the inner walls of the brine tubes in a region of a lower temperature than the scale eduction temperature. In addition, unnecessary wear of the sponge balls is avoided. Here it is noted that the idea of letting the sponge balls flow through only those brine tubes of a high temperature includes an idea of letting the sponge balls bypass the brine tubes of a low temperature as well as an idea of letting the sponge balls flow through the brine tubes of a low temperature without causing any effective contact between the balls and the inner walls of the tubes. A multistaged flash chamber assembly embodying the latter idea is shown in FIGS. 5 and 6. In this embodiment, reference numeral 61 designates the first or highest pressure stage and the pressures in the second to sixth stages each being designated by 62 to 66 are gradually lowered. Each two adjacent stage chambers are partitioned by a partition wall 67, and each chamber includes a flashing part 68 in a lower region and a condenser part 69 in an upper region thereof. Linearly penetrating the condenser parts of the first, second and third stages, there are provided condenser tubes (or brine heating tubes) 70, and linearly penetrating the condenser parts of the fourth, fifth and sixth stages, there are provided other condenser tubes 71. The outer ends of the tubes 70 and 71 are received in headers 72 and 73, respectively, provided at both linear ends of the assembly, and the inner ends of the tubes 70 and 71 are received in an intermediate header 74. The cross-sectional arrangements of the tubes 70 and 71 are best shown in FIGS. 7 and 8, respectively, and as it is apparent from FIG. 9, the inner diameter of the tube 71 is larger than that of the tube 70.

Steam generated in the flashing part 68 flows upward through steam-water separators 75 and is condensed by being cooled by the condenser tubes 70 or 71. The condensate is collected in condensate collectors 76 provided in the respective stages and flows through ports 77 to an exit port 78.

As seen from FIG. 9, the tube 71 has an inner diameter larger than the outer diameter of the sponge balls 81. Therefore, the sponge balls flow through the tube 71 substantially in no contact with the inner walls of the tubes. However, in the tubes 70, which have an inner diameter slightly smaller than the outer diameter of the sponge balls, the balls rub the whole inner walls of the tubes as they flow through the tubes in contact with them. When the intermediate header 74 is positioned between the third and fourth stages as in the example shown in FIGS. 5 and 6, the brine may naturally be heated above the scale eduction temperature in the first, second and third stages.

A brine heater (not shown) is positioned between the header 72 and the flash part 68 of the first stage 61. The brine heating tubes of the brine heater are preferably formed at tubes having the same inner diameter as the tubes 70 so that the scale attached on the inner walls of the heating tubes is forcibly removed by the same balls 81.

In operation, brine is supplied by a pump (not shown) to the header 73 and flows through the condenser tubes 71 in heat exchanging relation with steam in each stage toward the intermediate header 74. The sponge balls are also supplied into the header 73 and they flow through the tubes 71 with no substantial contact with the inner walls of the tubes 71. The brine and the sponge balls received in the intermediate header 74 are then flowed through the condenser tubes 70 in heat exchanging relation with steam in each stage toward the header 72. In the tubes 70, the brine is heated beyond the scale eduction temperature, and scales begin to attach on the inner walls of the tubes 70. However, these scales are rubbered off by the sponge balls 81 and carried away by being suspended in the brine. The brine and the sponge balls collected in the header 72 are further heated in the brine heater (not shown) and are introduced into the flashing part 68 of the first stage. Unevaporated brine flows to the next flashing part in succession and is finally discharged from a port 80. The discharged brine is in part exhausted and remainder is introduced into the header 73 for recirculation.

Figure 11:
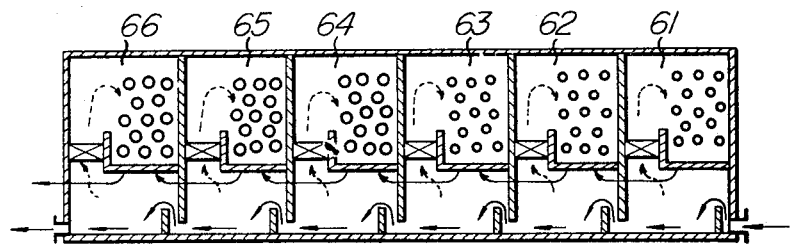
FIG. 11 is a vertical section of the assembly shown in FIG. 10.

FIGS. 10 and 11 show another embodiment of the same kind as that shown in FIGS. 5–9, but in this embodiment the condenser tubes in respective stages are arranged in orthogonal flow relation to the flashing flow of the brine. The condenser tubes in each stage are received by inlet and outlet headers 82 and 83 at both ends thereof and each adjacent outlet and inlet headers are connected by a conduit. The condenser tubes in the first, second and third stages 61, 62 and 63 have a small inner diameter and the tubes in the fourth, fifth and sixth stages 64, 65 and 66 have a large inner diameter. The operation of this evaporator is substantially same as that of the evaporator shown in FIGS. 5–9.

Figure 12:
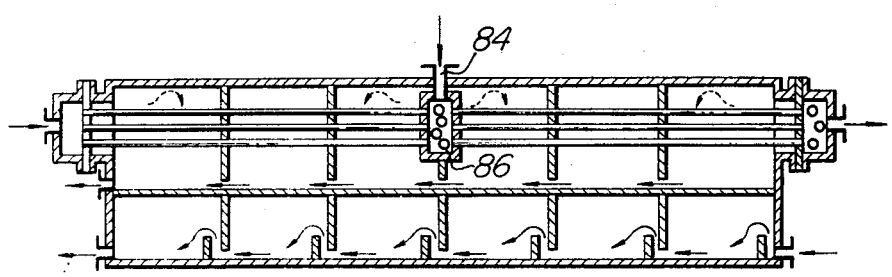
FIG. 12 is a vertical section of still another multistaged flash chamber assembly.
Figure 13:
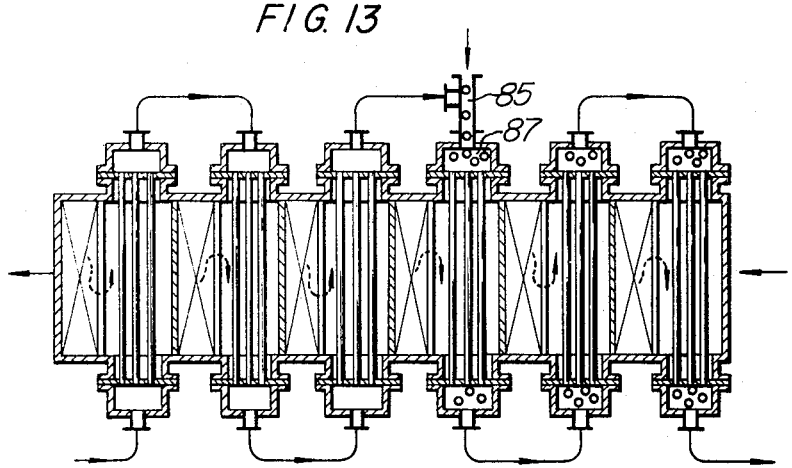
FIG. 13 is a horizontal section of still another multistaged flash chamber assembly.

In FIGS. 12 and 13, there are shown two embodiments wherein the sponge balls are only passed through the condenser tubes operated in the range of the scale eduction temperature. In these embodiments, the sponge balls are introduced into headers 86, 87 through sponge ball supply pipes 84, 85, which are located at the brine entrance to the steps of high temperature range. These embodiments are advantageous in preventing the tearing-off of the oxidized protection films on the inner walls of the brine tube in the low temperature range and in the economy of pumping power. FIG. 12 shows a flash chamber assembly of linear flow type and FIG. 13 shows that of orthogonal flow type.

In the final embodiment explained in the following, the removal of scale is further accelerated by a combination of the cold brine cleaning and the sponge ball cleaning.

This method is characterized by the following matters:

(1) To heat the brine which has been heated in the condenser parts of an evaporator further in a brine heater and introduce the heated brine into the evaporating parts of the evaporator (steps of heating and evaporating brine).

(2) To cut off the heat source of the brine heater when the coefficient of overall heat transmission has lowered and let cold brine flow through the condenser parts and the brine heater (step of cold brine flow).

(3) To supply sponge balls into the cold brine and collect the sponge balls after the removal of scale has been accomplished (step of sponge ball circulation).

By the cleaning flow of cold brine, the scale begins to dissolve into the cold brine. At the same time, the softening surface of the scale layer is rubbed off by the sponge balls to expose fresh under-layer which comes in good contact with the cold brine. After the dissolving of the scale has proceeded in a degree so as to leave a thin layer, the remaining layer is rubbed off as a whole by the sponge balls. In this manner, the use of the sponge balls accelerates the dissolving of the scale in the cold brine.

Figure 14:
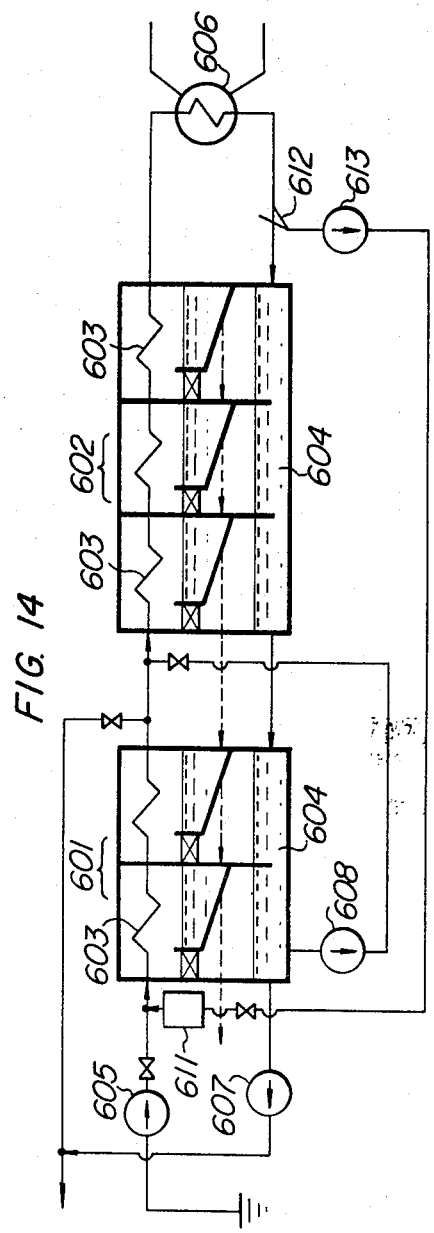
FIG. 14 is a diagram of a further multistaged flash evaporator for performing a method of this invention.

FIG. 14 shows an embodiment of the evaporator which is operated according to the abovementioned method. This evaporator includes heat exhausting stages 601 and heat recovering stages 602, each stage having a condenser part 603 in an upper portion thereof and an evaporating part 604 in a lower portion thereof. Brine is transferred by a brine pump 605 through the condenser parts 603 and a brine heater 606 to be heated therein and the heated brine is introduced into the evaporating parts 604 to be successively evaporated.

The brine remaining in the evaporating part of the last stage is in part exhausted by a blowdown pump 607 and the remainder is recirculated by a recirculation pump 608.

In this constitution, when the coefficient of overall heat transmission in the brine heater 606 has lowered, the heat source (e.g. steam) of the brine heater is cut off, and cold brine is passed through the condenser parts 603 and the brine heater 606. At the same time, sponge balls are introduced into the flow of cold brine from a sponge ball feeder 611. The sponge balls which have passed through the condenser parts 603 and the brine heater 606 by scrubbing the scale attached on the inner walls of the brine tubes are collected by a sponge ball collector 612 and transferred to the sponge ballfeeder 611 by a sponge ball recirculation pump 613.

We claim:

1. A method of operating a multistaged flash evaporator including a plurality of flashing chambers of successfully lowering pressures and temperatures, having a condenser part in each chamber composed of at least one brine tube and a flashing part which comprises passing brine successively through the condenser parts to pre-heat the brine and to condense steam evaporated in each flashing chamber, passing the pre-heated brine through a brine heater to heat the brine further, said brine being heated in the brine pipes of said condenser parts and in said brine heater to a temperature beyond a scale eduction temperature occurring at 80° C., delivering the heated brine to the flashing chamber of the highest pressure and temperature to effect evaporation of water from said brine and simultaneously introducing sponge balls successively into each of said brine tubes of said condenser parts and then into said brine heater with said brine during evaporation of said water to effect continuous removal of scale attached on the inner walls of said brine tubes and said brine heater.

2. The method of claim 1, wherein said sponge balls are recirculated to said condenser part of the last flashing chamber via the flashing sections of each successive flashing chamber.

3. The method of claim 2, wherein said sponge balls are suspended in the brine during the recirculation through said flashing chambers.

4. The method of claim 3, wherein said sponge balls have a specific gravity larger than that of the brine.

5. The method of claim 1, wherein said brine is passed through at least one initial comdenser part composed of brine tubes which are heated to a temperature below that at which scale eduction occurs and said sponge balls are by-passed around each initial condenser part prior to being introduced with the brine successively into the condenser parts heated to a temperature beyond said scale eduction temperature.

6. A method of operating a multistaged flash evaporator including a plurality of flashing chambers of successively lowering pressures and temperatures, each chamber having a condenser part composed of at least one brine tube and a flashing part, which comprises passing brine successively through the condenser parts to pre-heat the brine to a temperature beyond a scale eduction temperature occurring at 80° C. and to condense the steam evaporated in each evaporating chamber, passing the pre-heated brine through a brine heater to heat the brine beyond about 120° C., delivering the heated brine to the flashing chamber of the highest pressure and temperature to effect evaporation of water from said brine, measuring the coefficient of overall heat transmission in said brine heater, cutting off the supply of heat to said brine heater when the coefficient of overall heat transmission has lowered, allowing cold brine to flow through said brine tubes and simultaneously supplying sponge balls into the cold brine and into said brine tubes to effect removal of the scale attached on the inner walls of said brine tubes and said brine heater.

7. A multistaged flash evaporator comprising a plurality of flashing chambers of successively lowering pressures and temperatures, each flashing chamber from the first to the last having a condenser part composed of brine tubes for condensing steam evaporated in a flashing part thereof, means for introducing brine successively into the brine tubes of each condenser part of each flashing chamber, a brine heater arranged to heat the pre-heated brine further beyond a scale eduction temperature, means for delivering the heated brine from said brine heater to the flashing part of the first flashing chamber of the highest pressure and temperature, sponge ball feeder means for introducing sponge balls into said brine tubes simultaneously with said brine for continuously removing scale attached on the inner walls of said brine tubes and said brine heater, and means for recirculating said sponge balls with the brine successively through each of said flashing parts of the flashing chambers during evaporation of water from said brine.

8. The multistaged flash evaporator of claim 7, wherein said sponge balls have a specific gravity larger than that of the brine whereby said sponge balls are suspended in said brine during recirculation through each of said successive flashing parts of said flashing chambers.

9. The multistaged flash evaporator of claim 7, wherein a sponge ball collector is provided in the means for delivering the brine from said brine heater to said flashing chamber.

10. The multistaged flash evaporator of claim 7, wherein a sponge ball collector is provided in the flashing part of said flashing chamber which receives the brine from said brine heater and means for taking out the sponge balls are connected with said sponge ball collector.

11. The multistaged flash evaporator according to claim 7, wherein the brine remaining in the flashing part of the last flashing chamber at the lowest pressure is in part introduced into a brine tube of one of said condenser parts by a recirculation system to be recirculated, and an ejector means acting as a sponge ball feeder is provided in said recirculation system.

12. The multistaged flash evaporator of claim 7, wherein headers are provided at the entrance and exit of each condenser section composed of a plurality of brine tubes, one of said headers being adapted as a sponge ball feeder for introducing sponge balls into said brine tubes, and means collecting said sponge balls after they have passed through said brine tubes.

13. The multistaged flash evaporator of claim 12, wherein the initial condenser parts through which the brine passes are provided with brine tubes having a larger diameter than the brine tubes of the successive condenser parts whereby said sponge balls are in contact with the inner walls of those brine tubes in which scale attaches to the inner walls thereof.

14. The multistaged flash evaporator of claim 7, wherein said sponge balls are of a size corresponding to the inner diameter of the brine tubes and the brine heater and of a material sufficient for abraiding and removing said scale, said evaporator being so constructed that said sponge balls move only in the direction of flow of said brine until removed from the flowing stream of brine.

15. The multistaged flash evaporator of claim 7, wherein additional means are provided for by-passing a portion of the sponge balls around said successive flashing parts of said flashing chambers to the condenser part of said last flashing chamber.

References Cited

UNITED STATES PATENTS

| 14,230 | 2/1856 | Everett et al. | 203—7 UX |
|---|---|---|---|
| 1,795,348 | 3/1931 | Schmidt | 165—95 |
| 2,600,820 | 6/1952 | Whatley | 203—7 |
| 3,021,117 | 2/1962 | Taprogge | 165—95 |
| 3,084,110 | 4/1963 | Polk | 165—95 |
| 3,135,322 | 6/1964 | Neugebauer | 165—95 |
| 3,219,553 | 11/1965 | Hughes | 202—173 |
| 3,245,460 | 4/1966 | Loebel | 122——379 |
| 3,399,975 | 9/1968 | Otten | 203—7 |
| 3,442,769 | 5/1969 | Heinz | 203—7 |
| 3,476,655 | 11/1969 | Sieder | 203—7 |

WILBUR L. BASCOMB, JR., Primary Examiner

U.S. Cl. X.R.

203—7, 11, 88; 202—160, 173, 206; 15—3; 165—95